March 22, 1938.  J. J. LAWLOR  2,111,564
MOLDING MACHINE
Filed Feb. 20, 1936   7 Sheets-Sheet 1

INVENTOR
JOHN J. LAWLOR
BY
ATTORNEY

March 22, 1938.                J. J. LAWLOR                 2,111,564
                              MOLDING MACHINE
                         Filed Feb. 20, 1936        7 Sheets-Sheet 4

INVENTOR
JOHN J. LAWLOR,
BY
ATTORNEY

March 22, 1938. J. J. LAWLOR 2,111,564
MOLDING MACHINE
Filed Feb. 20, 1936 7 Sheets—Sheet 5

INVENTOR
JOHN J. LAWLOR,
BY
Louis Nechs
ATTORNEY

Patented Mar. 22, 1938

2,111,564

UNITED STATES PATENT OFFICE 2,111,564

MOLDING MACHINE

John J. Lawlor, Plainfield, N. J.

Application February 20, 1936, Serial No. 64,863

7 Claims. (Cl. 22—9)

My invention relates to a molding machine and it relates more particularly to an automatic molding machine comprising two juxtaposed mold forming units and an intermediate flask receiving unit in which the amount of manual labor involved is reduced to a minimum and in which the principal actuating parts are completely removed from the points at which the molding sand is handled thus preventing clogging up or corrosion.

My invention still further relates to a molding machine of this character which is of an extremely simplified construction thus reducing the expense of manufacture and operation and one in which the movement of the parts can be accurately and positively controlled in timed relation to each other so as to permit the forming of the flask sections in a continuous uninterrupted manner thus expediting the process of making molds.

My invention still further relates to a molding machine of this character in which the movement of the parts are confined to a range of the longitudinal dimensions of the machine thus economizing in the space occupied by the machine.

My invention still further relates to a molding machine in which the drag section of a mold is automatically turned from the up-side-down position in which the mold is formed to the right-side-up position on the receiving or booking table thus eliminating the necessity of manually turning the drag section about its axis during its transfer from the mold forming unit onto the receiving table.

My invention still further relates to a molding machine in which the removal of the completed molds from the receiving table is greatly facilitated, which is highly advantageous when the molds being formed are of relatively large dimensions and hence relatively great weight.

My invention still further relates to a molding machine embodying an automatic mold-transfer mechanism for removing the mold section from the mold forming unit onto the receiving table, said transfer mechanism being actuated during one-half of its travel by positive means, being adapted to complete the other half of its cycle by gravity thus reducing the cost of power consumption.

My invention still further relates to a molding machine the operating parts of which are interchangeable in that either part of the machine may be used to form the drag or cope section of a flask without any material change in the structure of the machine proper.

My invention still further relates to a molding machine which can be manufactured and shipped in relatively small, individual sections as distinguished from molding machines consisting of very huge unitary structures which are difficult to dismantle and difficult to ship without dismantling.

My invention still further relates to various other novel features of construction and advantage which will be more clearly hereinafter set forth in the accompanying drawings in which;

Fig. 2 represents, on an enlarged scale, a vertical section on line 2—2 of Fig. 1.

Fig. 8 represents a plan view of the under side of the jar-ramming platen forming part of the construction shown in Fig. 6.

Figure 1:
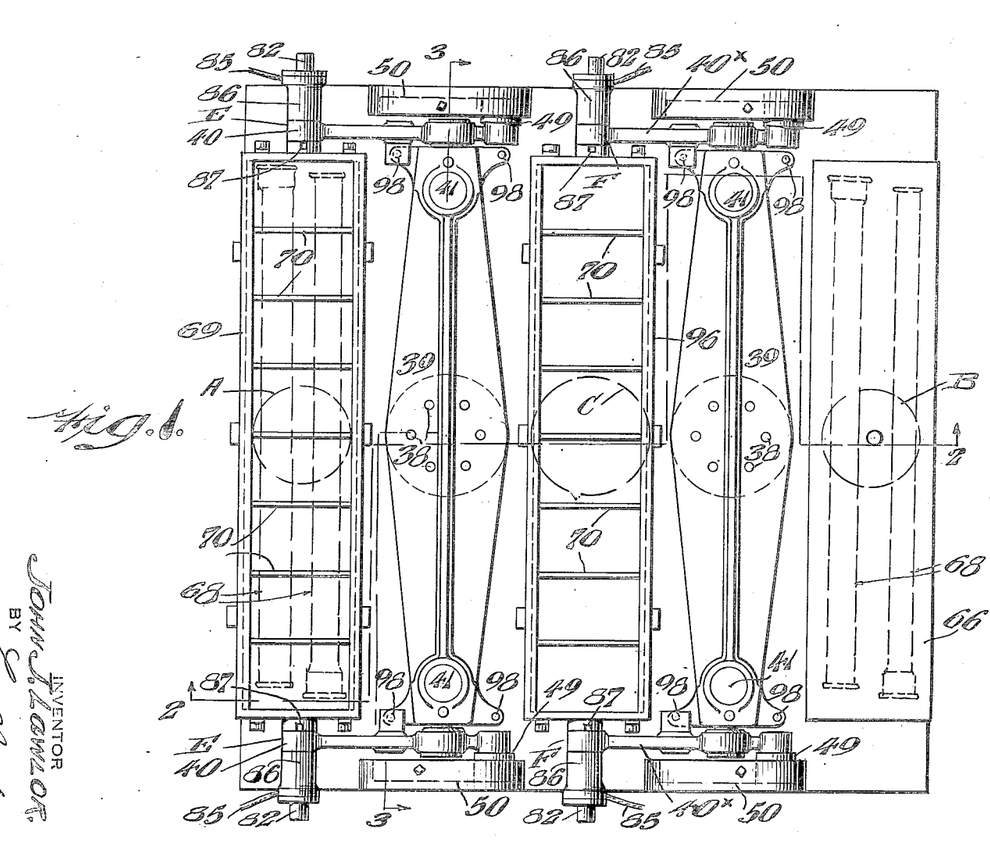
Fig. 1 represents a diagrammatic plan view of an automatic molding machine embodying my invention.

Referring to the drawings in which like reference characters indicate like parts and more particularly to Figs. 1 and 2, my novel automatic molding machine consists of two mold-forming units A and B adapted to form either the cope or drag sections of a mold interchangeably. In the present embodiment the unit A is illustrated as forming the drag section, and the unit B is illustrated as forming the cope section of a mold. C designates a flask receiving table, which may be positioned to one side of the units A and B to receive the cope and drag sections as they are formed, or it may, as illustrated in the present embodiment, be positioned intermediate the units A and B to serve both as a receiving and a "booking" table on which the drag and cope sections of a mold are deposited successively, in the order named, with the cope "booked" onto the drag ready for removal to the pouring room. The table C may be used alone, or, if desired, a suitable conveyor of the type disclosed in my Patent No. 2,013,858 may be associated therewith for automatic removal of the completed flasks from said table. Coacting with the mold-forming units A and B are the mold-section transferring mechanisms D and DX, respectively, which serve to remove the drag and cope sections from the mold-forming units A and B and to deposit them in the order named on the intermediate receiving and booking table C.

Figure 6:
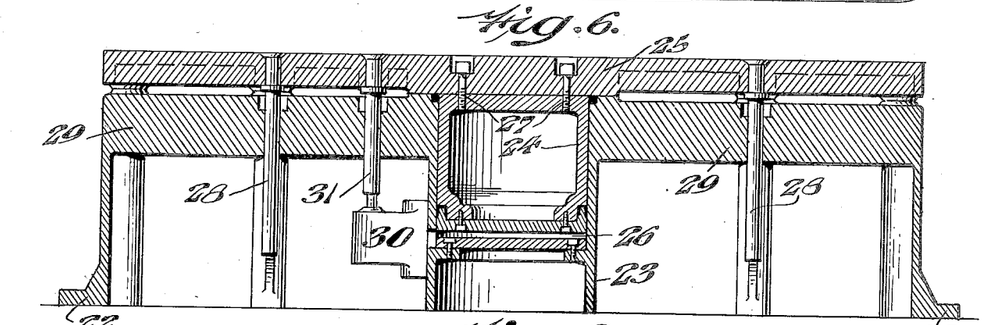
Fig. 6 represents, on an enlarged scale, a vertical longitudinal sectional view of one of the jar-ramming units.
Figure 7:
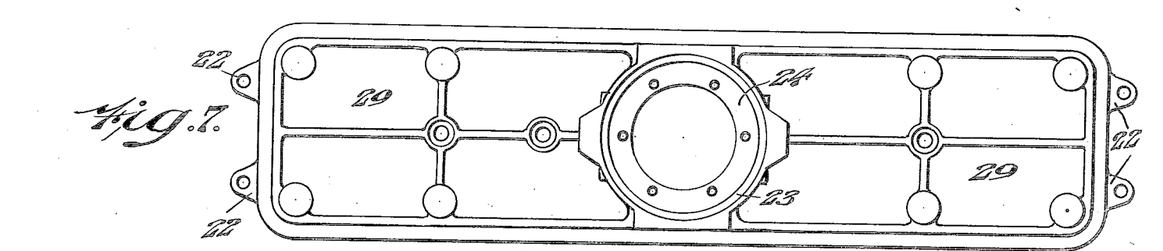
Fig. 7 represents a plan view of Fig. 6 with the jar-ramming platen removed.
Figure 9:
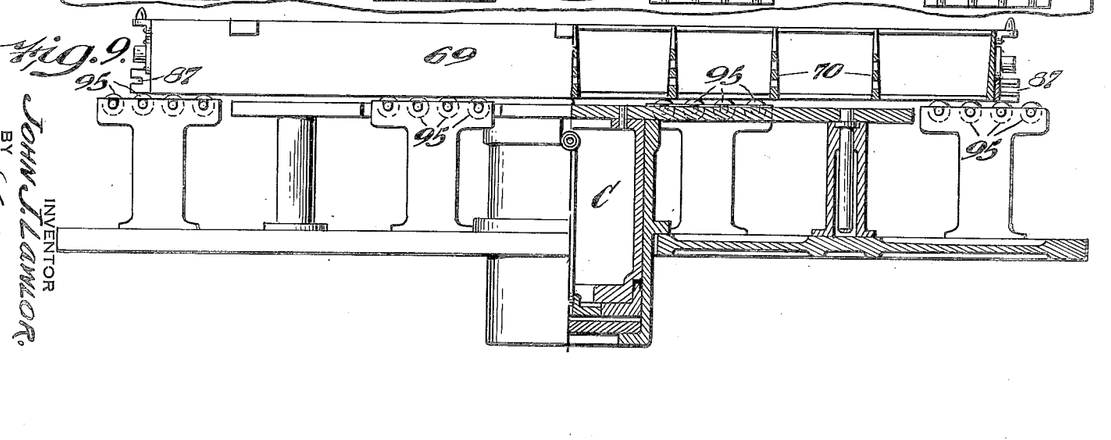
Fig. 9 represents a view, partly in section and partly in elevation, of the flask receiving table which, in the present embodiment, is shown intermediate the two jar-ramming units, the same being shown with a flask positioned thereon.
Figure 10:
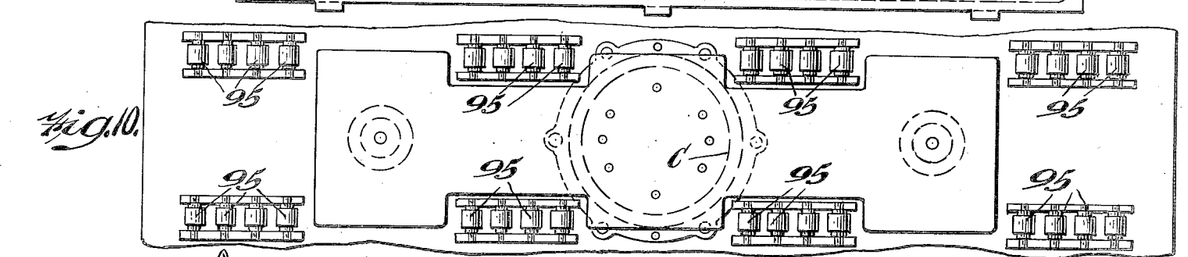
Fig. 10 represents a plan view of Fig. 9 with the flask removed.
Figure 11:
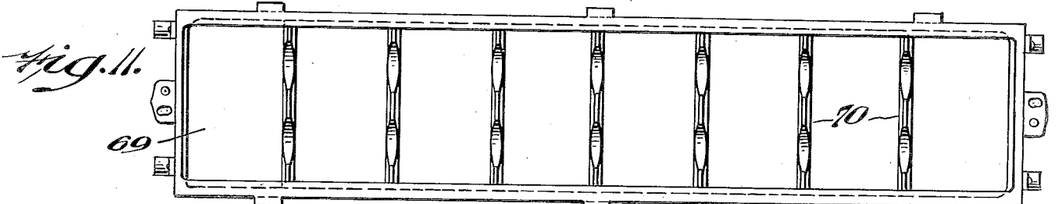
Fig. 11 represents a plan view of the flask which is shown partly in elevation and partly in section at the top of Fig. 9.

Each of the mold-forming units A and B comprises a jar-ramming table which is formed of the foundation 20 on which is mounted the base 22 in which is formed the cylinder 23 in which reciprocates the piston 24 to raise and drop the platen 25, the piston 24 being preferably actuated by air-pressure delivered to the chamber 26 formed between the piston 24 and the cylinder 23. The platen 25 is secured to the top of the piston 24 by any suitable means 27 and is provided with the guide-rods 28 passing through the top 29 of the base 22. In order to effect rapid, interrupted reciprocation of the platen 25, I feed the actuating compressed air through the valve 30 which is controlled by the stem 31 carried and moving with the platen 25. While I have described, in general, the structure of the jar-ramming table of one of the identical mold-forming units A and B, I wish to point out that the complete structure of this device is disclosed in prior Patents Nos. 1,782,762 and 1,784,995, and, that, therefore it is deemed unnecessary, here, to show or describe it in further detail.

In order to transfer the mold section formed on either of the units A or B onto the receiving or booking C, I provide the identical transfer mechanisms D and DX each of which comprises a cylinder 32 positioned on a suitable foundation and in which is vertically movable the piston 33 which is actuated by air-pressure delivered through the pipe 35 which leads into the chamber 36 formed between the piston 33 and the cylinder 32. Any suitable conventional means (not shown) for controlling the introduction of the air into the chamber and for exhausting said air, may be provided. Secured to the top of the piston 33 by any suitable means 38 is the yoke 39 which carries, at its opposite ends, the pairs of arms 40 and 40X which are adapted to engage a flask section at either end thereof, in the manner which will hereinafter be described. The yoke 39 is provided, near the ends thereof, with the guide-rods 41 which travel vertically in appropriate cylinders 42 to insure constant centralization and alignment of the yoke 39 in its rise and fall through the range of its movement. The arms 40 and 40X are rotatably mounted on the ends of the yoke 39 and are provided with the anti-friction bearings 46. The arms 40 are provided at their outer ends with the flask-engaging trunnion heads E and F, hereinafter referred to, and at their inner ends with the rollers 49 which are adapted, when the pistons 33 and the yokes 39 are elevated, to travel on the overhead tracks 50 to move the arms 40 and 40X into the various positions shown in solid and dotted lines in Fig. 2.

The table C, which is adapted to receive the flask sections separately or in the booked or closed position illustrated in Fig. 2, consists of a suitably anchored cylinder 60 in which is vertically movable the piston 61 which is actuated by compressed air delivered through any suitable means 62 to the chamber 63 between the piston 61 and cylinder 60 to raise and lower the platform 64 which is secured to the head of the piston 61 by any means 65 for a purpose hereinafter more fully set forth.

Figures 3, 15:
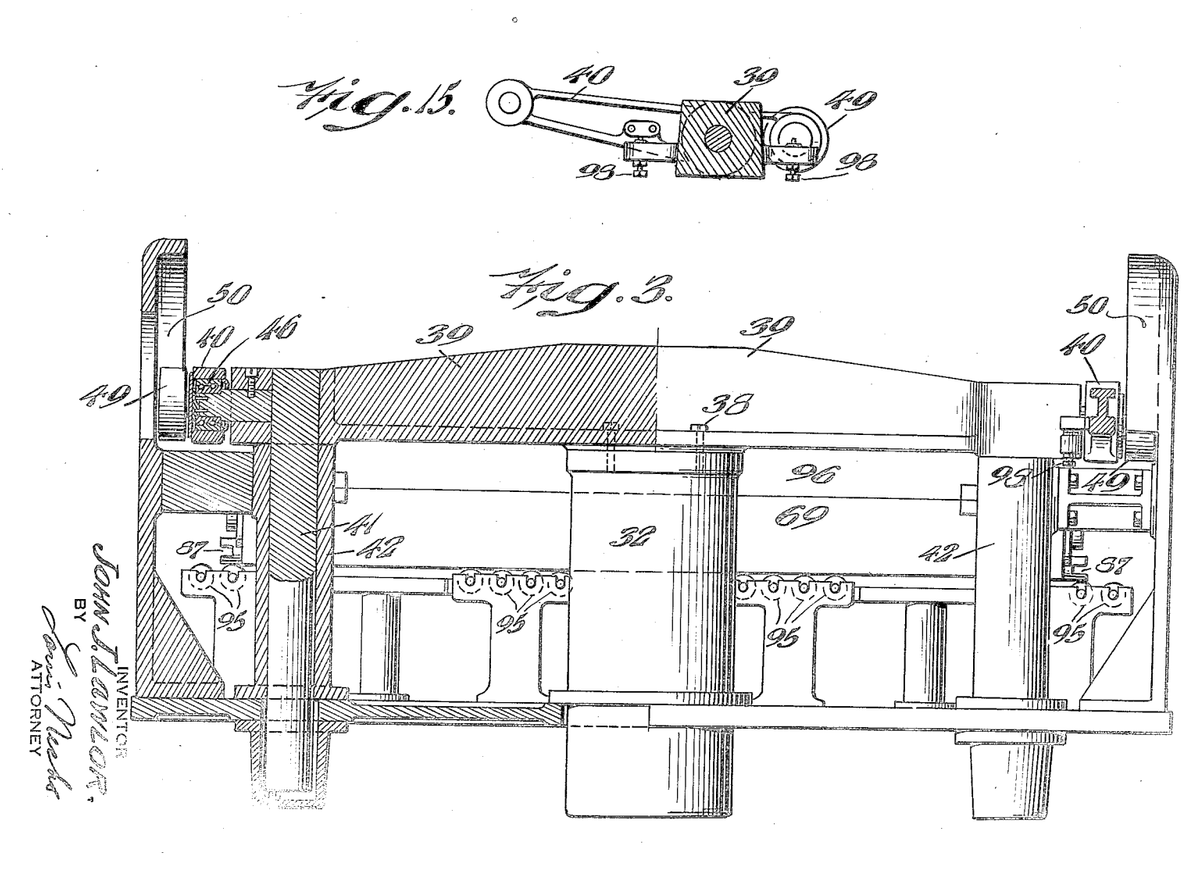
Fig. 3 represents, on an enlarged scale, a vertical section on line 3—3 of Fig. 1.
Fig. 15 represents a view partly in section and partly in elevation showing details of construction of one of the transfer arms for removing a flask section from either of the jar-ramming units onto the flask receiving table.
Figures 3, 4, 16:
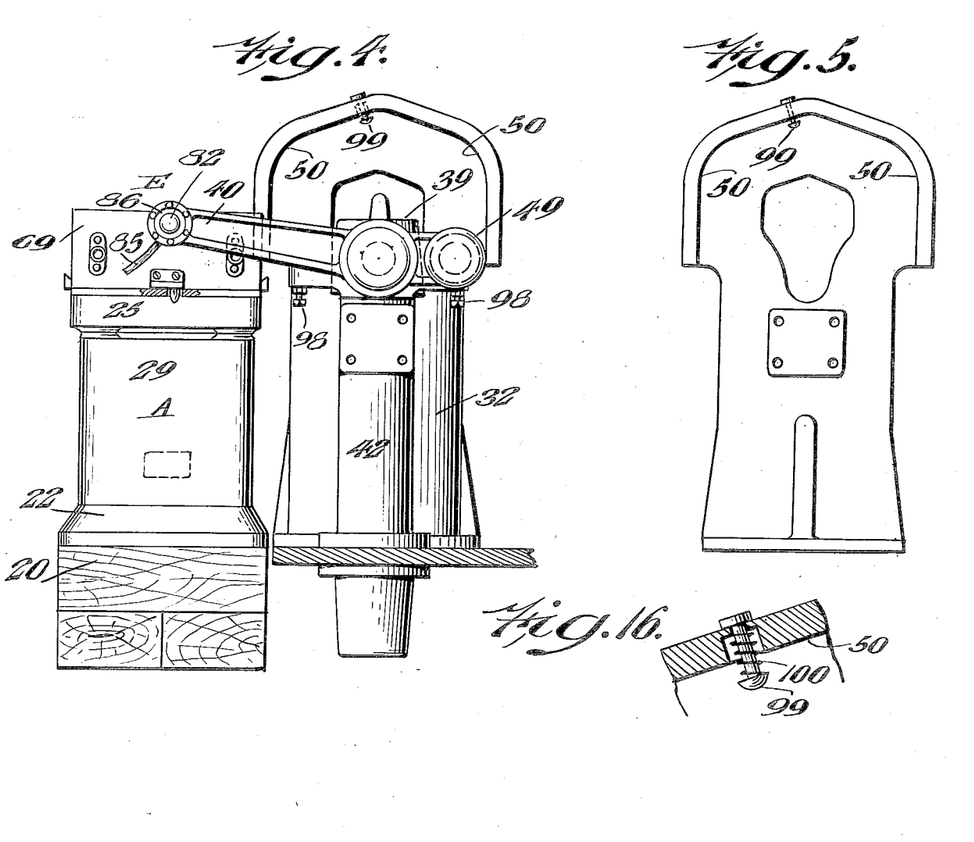
Fig. 4 represents a fragmentary, diagrammatic view in elevation of one of the jar-ramming units with one of the guide plates removed to show internal construction.
Fig. 16 represents a view, on an enlarged scale, partly in section and partly in elevation showing details of construction of means for actuating the transfer arms shown in Fig. 15.
Figure 4:
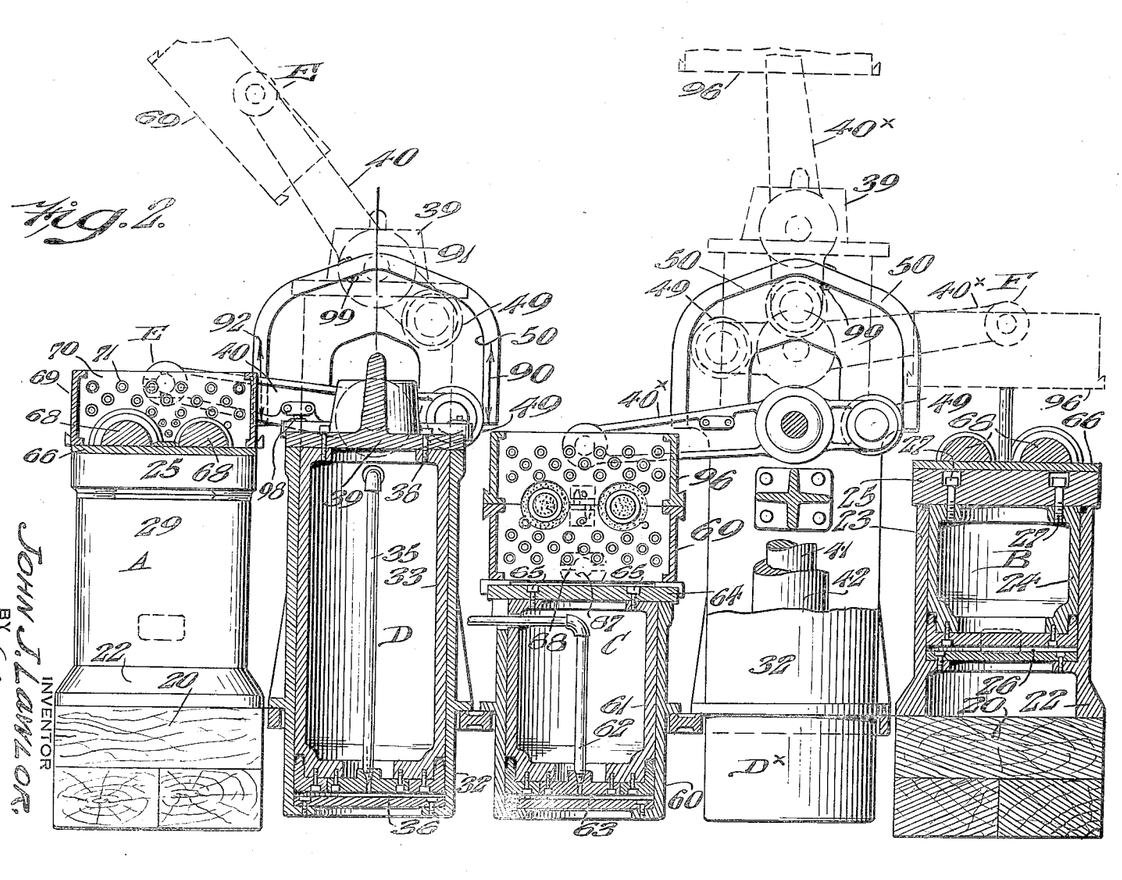
Figure 5:
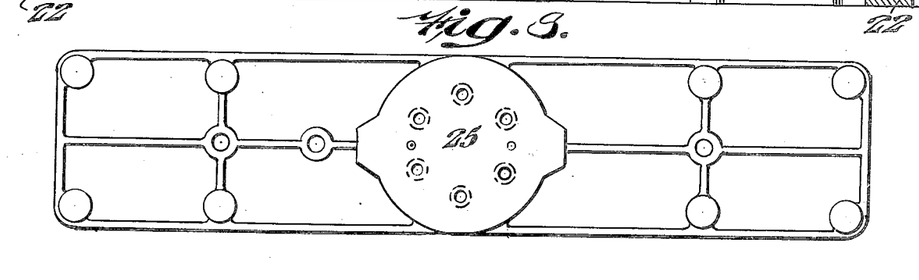
Fig. 5 represents a view in elevation of the inner face of the guide-plate removed from Fig. 4.
Figures 12, 13, 14:
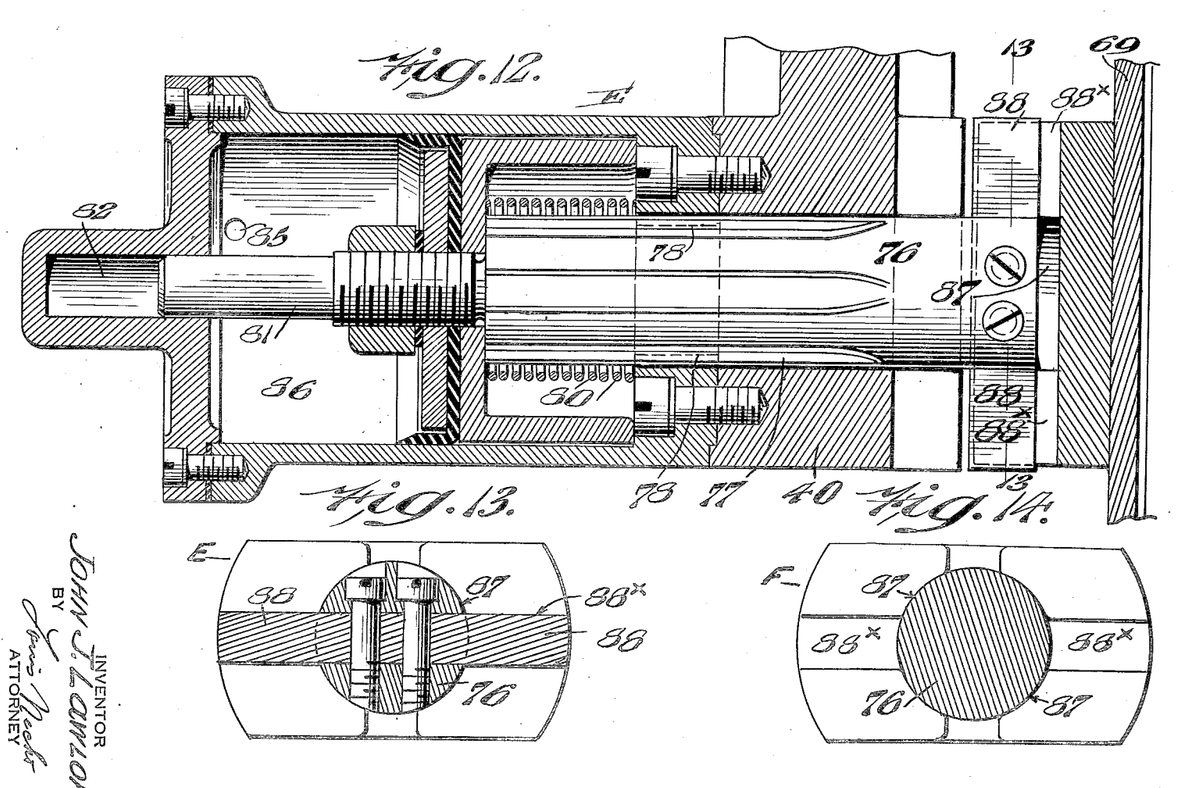
Fig. 12 represents, on a greatly enlarged scale, a view in longitudinal section showing details of construction of one of the trunnions for engaging the drag section of the flask.
Fig. 13 represents a section on line 13—13 of Fig. 12.
Fig. 14 represents a view similar to Fig. 13 showing details of construction of one of the trunnions for engaging the cope section of the flask.

The operation is as follows:

A pattern plate 66 having the drag section of the pattern 68 thereon is first positioned on the jar-ramming table of the mold-forming unit A and the drag section of a flask is placed thereover or built therearound as the case may be. Sand is then filled around the pattern 68 by the violent and jerky, vertical reciprocation of the jar-ramming table with or without the assistance of the jolt butt-off which is in the nature of a heavy plate resting on the surface of the sand in the flask 69, or if desired, a pneumatic tamping device can be used on the upper surface of the sand, manually, or through any desired automatic construction. When the machine is to be used for molding relatively long pipe sections, as illustrated in the drawings, the flask is provided with the transverse partitions 70 which are perforated as at 71 and which serve to support the molded sand prior to the pouring, and the perforations 71 permit the dispersion of the sand, uniformly, throughout the flask during the jar-ramming operation. During the formation of the drag section of the mold, the corresponding pair of arms 40 mounted on the ends of the corresponding yoke 39 are in the positions shown in full lines shown in Fig. 2 with the trunnion head E thereof positioned in proximity to either end of the elongated flask section 69. The construction of the trunnion heads E at the ends of the arms 40 is best shown in Figs. 12 and 13 and consists, generally of the bolt 76 which is provided with the splines 77 engaging corresponding key-ways in the sleeve 78 and carrying the spring 80, which normally retains the bolt in its withdrawn position (to the left in Fig. 12) so that the stem 81 of the bolt 76 is seated in the recesses 82. In this position the trunnion heads E are out of engagement with the flask. When it is desired to engage the trunnion heads E with the flask in order to remove the completed drag section of the mold from the mold-forming unit A onto the table C, compressed air is admitted through the conduits 85 into the chamber 86 which serves to force the bolt 76 outwardly (to the right in Fig. 12) to bring the head of the bolt, as well as the transverse key member 88 into engagement with the round hole 87 and transverse slot 88X formed at either end of the drag section of the flask. This effects a rigid engagement between the trunnion heads E on the arms 40 at either end of the yoke 39 and the opposite ends of the drag section of the flask. Compressed air is now admitted into the chamber 36 to raise the piston 33 and the yoke 39 and arms 40 carried thereby. When the piston 33 rises, the rollers 49 travel upwardly along the inner face of the track 50, and as long as the rollers 49 travel over the vertical section designated by the arrow 90 the arms 40, except for being raised, remain in the same relative position illustrated in full lines in Fig. 2. When the rollers 49 begin to travel over the curvilinear section of the track 50 intermediate the upper end of the arrow 90 and the dead center point 91, the arms 40 being rotatably mounted on the ends of the yoke 39 are gradually elevated until both of the rollers 49 have reached the dead center 91, the arms 40 carrying the flask section 69 are substantially vertical with respect to the vertical axis of the cylinder 33 except that, due to the fact that the arms 40 are offset or deflected with respect to the vertical axis (see the positions of the arms 40X in dotted lines in the right hand portion of Fig. 2) the center of gravity of the flask 69 has passed the dead center 91 so that by exhausting the air from the chamber 36 the piston 33 is allowed to fall slowly and gravitationally and the travel of the rollers 49 over the curvilinear section of the overhead track 50 between the dead center 91 and the top of the arrow 92 will result in reversing the motion of the arms 40 and gradually lowering the same until they assume a horizontal position on a level with the top of the arrows 90 and 92. At this point the rollers 49 begin their descent along the vertical portion of the track 50 designated by the arrow 92 and bring the flask section 69, which by the motion of the arms 40 through 180° has been turned completely about its axis, approximately to the level of the upper edge of the flask 69 as it is shown resting on the table C. While the flask section 69 is being turned upon its axis and brought over from the mold-forming unit A, the piston 61 carrying the platform 64 of the receiving table C is elevated by introduction of air into the chamber 63 to receive the drag section 69 of the flask. The receiving table is of sufficiently the same length as the length of the flask to be deposited thereon and is provided on its upper surface with the rollers 95 which facilitate the movement of the flask over the top of the table, and while I have not shown it in the drawings since I did not deem it necessary to do so, I wish to point out that it is within the scope of my invention, if so desired, to slope the table C slightly in either direction along its longitudinal axis so as to permit the flask section deposited thereon to roll off automatically by gravity onto a conveyor for delivery to the pouring room, or for other disposal. When the arms 40 have deposited the flask section 69 on the elevated platform 64 of the receiving table C, the air initially introduced into the chamber 86 through the inlet 85 to force the trunnion heads E to engage the ends of the flask is exhausted and the spring 80 automatically withdraws the trunnion heads E from engagement with the ends of the flask section 69. The air then is exhausted from the chamber 63 and the piston 61, and the platform 64 carrying the flask section 69 are gradually lowered by gravity until they assume the position shown in Fig. 2. In the meantime another flask section 69 has been placed on the mold forming unit A and was packed and jar-rammed, etc. To bring the arms 40 to the position shown in full lines in Fig. 2, that is, ready for reengagement with a new flask section being made, air is again introduced into the chamber 36 to raise the piston 33 and yoke 39 and the reverse travel of the rollers 49 on the vertical section 92 of the track 50 and into the position of the rollers shown in full lines in Fig. 2, will bring the arms 40 back into their initial position. While the drag section 69 was being brought over from the unit A to be deposited on the table C, the cope section 96 was being prepared and then the same was engaged by the trunnion heads F on the arms 40X and brought over and deposited over the drag section 69 to complete the flask. The mechanism, which actuates the arms 40X and their operation, is identical with that described with the arms 40 except that, inasmuch as it is necessary to turn the cope section 96 on its axis intermediate the mold-forming unit B and the table C, the trunnion heads F differ from the trunnion heads E in that the key 88 is lacking, so that, while the drag section 69 is rigidly carried by the arms 40, the cope section 96 is rotatably carried by the arms 40X. In order to effect the necessary adjustment of the lowermost position of the arms 40 and 40X whether they be in the position ready to engage the respective flask sections 69 and 96, or whether they be in the position of depositing the respective flask sections on the table C, which adjustment may be necessary because of the play that might develop, or because of slight variations in the dimensions of the flask or its parts, I provide the adjustment screws 98, best seen in Fig. 4, on the upper ends of which the arms rest when in their horizontal positions so that, by raising or lowering the set screws 98, the necessary adjustment can be effected.

Due to the offset position of the arms 40 and 40X with respect to the vertical axis of the actuating piston 33, I utilize the bolts 99 which are tensioned by the springs 100 and which serve to propel the arms 40 and 40X past the dead centers 91 when said arms are on their way to the respective molding units A and B. Thus the bolts 99 are positioned in the overhead tracks 50 to the left of the dead center 91 in connection with the molding unit A and to the right of the dead center 91 in connection with the molding unit B, it being understood that when the piston 33 is being raised by the positive action of the compressed air, the rollers 49 will press the bolts 99 out of the way against the tension of the springs 100, said springs being sufficiently strong to resist the pressure of the rollers 49 when the arms 40 and 40X are on their return journey without a load and are on their downward movement by the force of gravity.

Thus, when the rollers 49 of either of the arms 40 and 40X have reached the dead center 91 of either of the units D and DX, respectively, on their return journey without a load but ready for picking up the drag or cope sections 69 and 96, respectively (to which position the rollers 49 have been actuated by the respective pistons 33) the tensioned bolts 99 will exert pressure on the rollers 49 to move the same past the dead center (to the right in connection with unit D and to the left in connection with unit DX, as viewed in Fig. 2) thus permitting the arms 40 and 40X to continue their descent by gravity as the air is exhausted from the respective chambers 36 to permit the descent of the pistons 33. The elevation or upward movement of the receiving table C is predetermined by the depth of the flask section 69, that is, where a shallow flask section 69 is being used, the table C will have to be elevated more than it would be when a deeper flask section 69 is employed.

Having thus described my invention what I claim as new and desire to secure by Letters Patent is;

1. In a molding machine, a mold-transferring mechanism for removing a mold from a mold-forming unit onto a mold-receiving unit, comprising a pair of arms pivotally mounted upon a horizontal shaft and adapted to engage with the ends thereof to one side of the pivot point the mold to be removed, cam surfaces, and rollers at the ends of said arms to the other side of the pivot point adapted to travel on said cam surfaces to actuate said arms in a vertical, arcuate path between said mold-forming unit and said mold-receiving unit.

2. In a molding machine, a mold-transferring mechanism for removing the finished mold from a mold-forming unit onto a mold-receiving unit, comprising a pair of arms pivotally mounted upon a horizontal shaft and adapted to engage with the ends thereof to one side of the pivot point the mold to be removed, cam surfaces, and rollers at the ends of said arms to the other side of the pivot point adapted to travel on said cam surfaces to actuate said arms in a vertical plane at right angles to their horizontal shaft in an arcuate path between said mold-forming unit and said mold-receiving unit.

3. In a molding machine a mold-transferring mechanism for removing the finished mold from a mold-forming unit onto a mold-receiving unit, comprising a pair of arms pivotally mounted upon a horizontal shaft and adapted to engage with the ends thereof to one side of the pivot point the mold to be removed, cam surfaces, and rollers at the ends of said arms to the other side of the pivot point adapted to travel on said cam surfaces, to actuate said arms in a vertical, arcuate path between said mold-forming unit and said mold-receiving unit, said cam surfaces being formed of oppositely disposed symmetrical halves meeting at a top dead center, whereby the travel of the rollers over the symmetrical halves on one side of the dead center of said overhead tracks results in raising the arms in one direction, and whereby the travel of said rollers over the opposite halves of said cam surfaces results in lowering said arms in the opposite direction.

4. In a molding machine a mold-transferring mechanism for removing the finished mold from a mold-forming unit onto a mold-receiving unit, comprising a pair of arms pivotally mounted upon a horizontal shaft and adapted to engage with the ends thereof to one side of the pivot point the mold to be removed, cam surfaces, rollers at the ends of said arms to the other side of the pivot point adapted to travel on said cam surfaces to actuate said arms in a vertical, arcuate path between said mold-forming unit and said mold-receiving unit, said cam surfaces being formed of oppositely disposed symmetrical halves meeting at a top dead center, whereby the travel of the rollers over the symmetrical halves on one side of said dead center of said cam surfaces results in raising the arms in one direction, and whereby the travel of said rollers over the opposite halves of said cam surfaces results in lowering said arms in the opposite direction, and means to one side of said dead center adapted to engage said rollers and to push the latter past said dead center.

5. A molding machine comprising a jar-ramming table for the forming of a mold section, and a transfer unit for removing said mold section from said jar-ramming table, comprising a cylinder, a piston movable in said cylinder, an arm pivotally carried by said piston, an arched cam surface, and a roller on the end of said arm and adapted to travel upon the underside of said cam surface when the piston is raised in said cylinder.

6. A molding machine comprising a jar-ramming table for the forming of a mold section, and a transfer unit for removing said mold section from said jar-ramming table, comprising a cylinder, a piston movable in said cylinder, an arm pivotally carried by said piston, an arched cam surface, a roller on the end of said arm and adapted to travel upon the underside of said cam surface when the piston is raised in said cylinder, said cam surface being composed of oppositely disposed symmetrical sections, and means for raising said piston to move said roller over one-half of said cam surface in one direction, said roller being adapted to travel over the other half of said cam surface in the opposite direction when the piston is allowed to drop by force of gravity.

7. In a molding machine, a mold-transferring mechanism for removing a mold from a mold-forming unit onto a mold-receiving unit, comprising a pair of arms pivotally mounted upon a horizontal shaft and adapted to engage with the ends thereof to one side of the pivot point the mold to be removed, cam surfaces, rollers at the ends of said arms to the other side of the pivot point adapted to travel on said cam surfaces to actuate said arms in a vertical, arcuate path between said mold-forming unit and said mold-receiving unit, and means for adjustably limiting the range of movement of said arms.

JOHN J. LAWLOR.